United States Patent [19]

Watanabe

[11] Patent Number: 4,829,169
[45] Date of Patent: May 9, 1989

[54] IC CARD HAVING STATE MARKER FOR RECORD ACCESS

[75] Inventor: Hiroshi Watanabe, Kokubunji, Japan

[73] Assignee: Toppan Moore Company, Inc., Tokyo, Japan

[21] Appl. No.: 879,287

[22] Filed: Jun. 27, 1986

[30] Foreign Application Priority Data

Jul. 1, 1985 [JP] Japan .................................. 60-144286
Mar. 31, 1986 [JP] Japan .................................. 61-73184

[51] Int. Cl.⁴ ............................................ G06K 19/06
[52] U.S. Cl. ...................................... 235/492; 235/380
[58] Field of Search ......................... 235/379, 380, 492

[56] References Cited

U.S. PATENT DOCUMENTS 4,105,156 8/1978 Dethloff .
4,204,113 5/1980 Giraud et al. .
4,656,342 4/1987 Ugon .............................. 235/492 X
4,683,372 7/1987 Matsumoto ........................ 235/492
4,736,094 4/1988 Yoshida ........................... 235/492 X Primary Examiner—David L. Trafton
Attorney, Agent, or Firm—Kenyon & Kenyon

[57] ABSTRACT

An IC card including a control section and a writable memory, wherein the memory is provided with an index section and a storage area section for recording data. Storage areas are allocated in the memory by use of indices, namely, parameters including a start address of each storage area, a number of records, and a record length are written in each index and the control section calculates an address of each storage area by use of the parameters according to an address calculation program.

25 Claims, 19 Drawing Sheets

FIG. 13
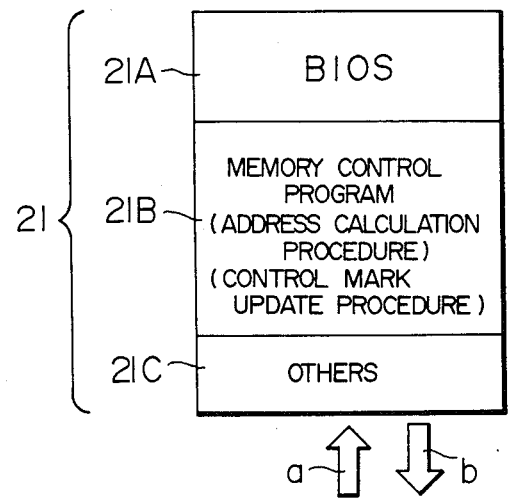
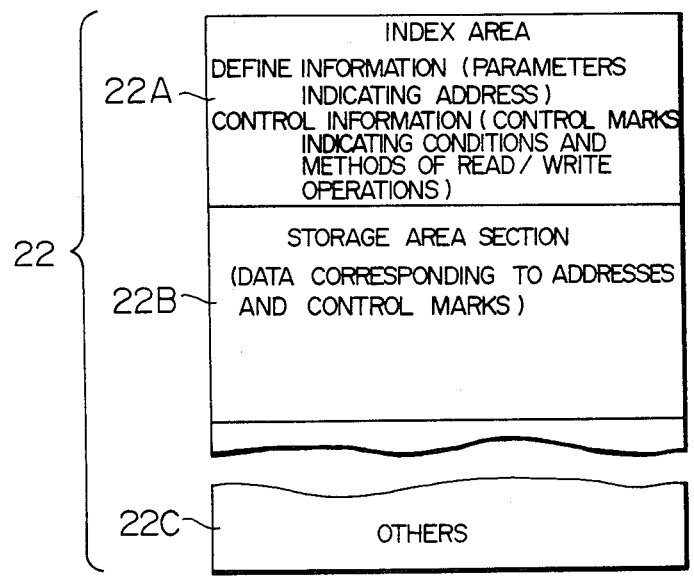

FIG. 15

| | | 7 | 6 | 5 | 4 | 3 | 2 | 1 | 0 |
|---|---|---|---|---|---|---|---|---|---|

STORAGE AREA DEFINE INFORMATION:

| Byte | Content |
|---|---|
| 1ST BYTE | 0 \| 0 \| 0 \| STORAGE AREA START ADDRESS (HIGH ORDER) |
| 2ND BYTE | STORAGE AREA START ADDRESS (LOW ORDER) |
| 3RD BYTE | W.S.L \| R.S.L |
| 4TH BYTE | WU-KEY LEVEL |
| 5TH BYTE | RU-KEY LEVEL |
| 6TH BYTE | RECORD LENGTH |
| 7TH BYTE | NUMBER OF RECORDS |
| 8TH BYTE | STORAGE AREA MODE |
| 9TH BYTE | STORAGE AREA ID(1) |
| 10TH BYTE | STORAGE AREA ID(2) |

STORAGE AREA CONTROL INFORMATION:

| Byte | Content |
|---|---|
| 11TH BYTE | W. UNLOCK COUNT \| 0 \| W KEY ERROR COUNT |
| 12TH BYTE | R. UNLOCK COUNT \| 0 \| R KEY ERROR COUNT |
| 13TH BYTE | RECORD ADDRESS |
| 14TH BYTE | F \| STORAGE AREA STATUS |
| 15TH BYTE | STORAGE AREA ATTRIBUTE (1) |
| 16TH BYTE | STORAGE AREA ATTRIBUTE (2) |

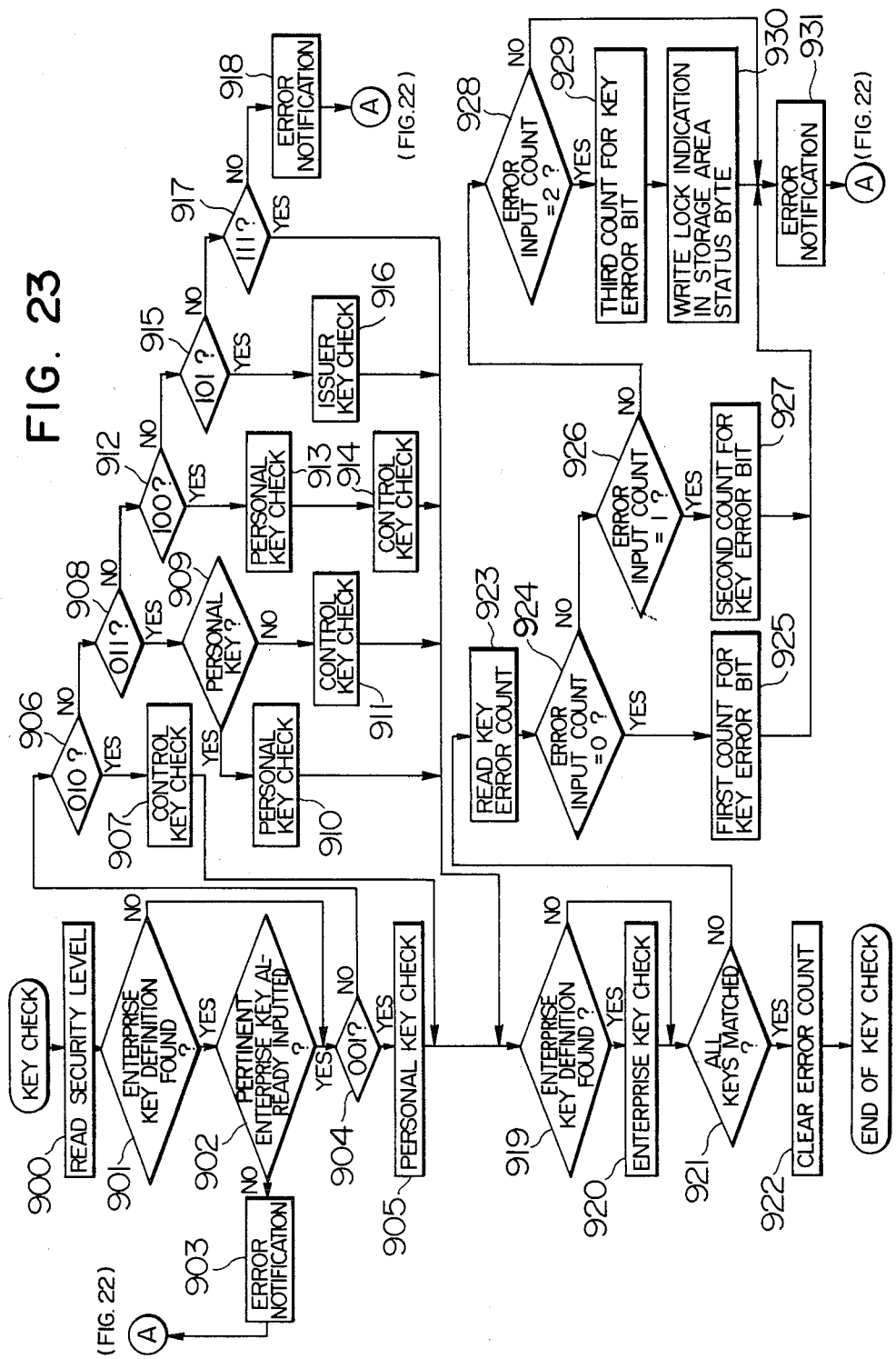

IC CARD HAVING STATE MARKER FOR RECORD ACCESS

BACKGROUND OF THE INVENTION

The present invention relates to an integrated circuit (IC) card containing integrated circuits such as a microcomputer and a memory unit, and particularly, to an IC card configured to arbitrarily divide a storage area of the memory unit depending on utilization purposes, thereby enabling efficient use of the limited memory capacity and allowing a general-purpose production system to be applied to the IC card production.

An IC card or so-called smart card is produced in various shapes, for example, there exist a flat card, a key-shaped card, and a rod-shaped card. The IC card of the present invention covers all of these cards.

An IC card contains elements such as a microprocessor (CPU) and a memory unit and hence is a small-sized information processing system having functions of decision and storage. Consequently, the data integrity and security can be further enhanced as compared with the conventional magnetic card such as a credit card or a bank card. Furthermore, since the storage capacity has been greatly increased through the advance of the IC technology, the IC card is regarded as efficient for the information storage card.

For the memory unit of an IC card, a nonvolatile IC memory such as an erasable, programmable read-only memory, EPROM in which stored data can be erased by ultraviolet radiation or an electrical, erasable, programmable read-only memory, EEPROM is used, and hence the storage contents can be kept therein without requiring a power source to be integrated in the card. Consequently, the memory unit can be produced in a simple structure and is thus adopted as the primary storage means of the IC card at present. However, a volatile IC memory such as a random access memory, RAM can also be used as the memory of the IC card if a long-life power supply such as a battery is built in the IC card to keep the contents thereof or as means for temporarily saving storage contents therein from another memory without integrating a power supply in the card.

In the past, data is generally stored in the IC memory as follows. A storage area having an appropriate size is allocated in the IC memory, and then the information of data is sequentially written beginning from an end thereof.

The entire information thus stored is conventionally read out at a time; or various information items are respectively stored in a plurality of storage areas, and a desired information is read by specifying the storage area number associated with the information, thereby retrieving the information from each storage area.

The information items to be stored in an IC card have various lengths. For example, the length of a name of Japanese is at most about 15 kana (Japanese syllabary) characters, which requires a record length of about 15 bytes (the length of a unit data to be stored). When considering change of the name due to marriage or adoption, about three records (the number of the unit data items to be stored) are necessary for the update of the name. Consequently, the required memory capacity for the name is 15 bytes×3 records=45 bytes. In contrast, since the sex field contains an indication of female or male, a 1-byte record is satisfactory. Ordinarily, the sex is not changed in usual cases, only one record is required, and hence the necessary memory capacity is 1 byte×1 record=1 byte.

Conventionally, when the size of a storage area or the number of records in a storage area is recorded in the memory, the address calculation is achieved on assumption that the record length is constant. In the foregoing example, the record length is set to 15 bytes according to the record length of name, that is, the record length of sex is also set to 15 bytes. However, only one byte is actually written in the 15-byte sex field, consequently the remaining 14 bytes are left blank, which deteriorates the memory utilization efficiency.

Moreover, since the required record length and number of records vary depending on the usages of the IC card, the memory allocation for the IC production must be changed for each kind of IC card. This requires a process step for generating a mask (allocation), soars the production cost, and increases the period of time required for the delivery of products; namely, a general-purpose production is not applicable.

In the past, even if a plurality of storage areas are included in an IC card, the same control is effected with respect to an access condition to any storage area, that is, the access condition is applied to all the storage areas. As a consequence, an access lock imposed on a storage area causes the other storage area to be subjected to the access lock. For example, for an IC card for which an access to a storage area is inhibited when the number of operations to input a wrong password value to the storage area exceeds the preset value, if the present value is exceeded, all storage areas or the entire IC card cannot be accessed.

Recently, an IC card or so-called complex IC card, has been proposed for an application in which transactions of the owner of the IC card with a plurality of different types of companies or enterprises including banks, department stores, and finance companies offering installment plans can be processed by use of the IC card. In such a card, the respective storage areas are used to store data of the different companies and hence must be controlled independently of each other. In the conventional IC card, however, the storage areas are controlled as an entity of the IC card, which may lead to an impingement of data security among the related companies or to an deterioration of the utilization efficiency of the IC card.

SUMMARY OF THE INVENTION

It is therefore an object of the present invention to provide an IC card which improves the memory utilization efficiency as compared with the conventional IC card so as to develop the general-purpose production of the IC card and to increase the productivity thereof.

Another object of the present invention is to provide an IC card having memory control means capable of controlling a plurality of memory areas independently of each other.

To achieve these objects, an IC card according to the present invention includes a control section and a writable storage in which a plurality of indices and a plurality of storage areas for writing data therein can be allocated; the indices can be used to write therein parameters defining an address of each of the storage areas; and the control section includes means for calculating an address of data to be stored by use of the index parameters and for setting a storage area according to the result of the calculation.

When data is to be written in the writable storage, the index parameters such as the first address of data to be stored, the number of records, and the record length are first written in the associated index area. The index areas are allocated as many as there are storage areas, and hence the write operation is repeated accordingly for the index areas. In another embodiment of the present invention, the writable storage is provided with an index close bit which is set, when a write operation is completed on an index area, to indicate that the index area has undergone a write operation. That is, when data is written in an index area, the close bit is set to the written state, which prevents a duplicated write operation and an additional write operation on the index area.

When the write operation is completed on the index areas, the storage areas are allocated for each data depending on the index parameters including the start address, the number of records, and the record length stored in the index areas, and then the data is written in the pertinent storage area.

To read data from such a storage area, a program in the control section calculates the address of the specified data based on the index parameters in the index area, namely, the start address, the number of records, and the record length; and thereafter the data is read by accessing the obtained address.

In another embodiment of the present invention, the writable storage is provided with a plurality of first indices and a plurality of second indices corresponding thereto wherein an index parameter defining an address of each said storage area can be written in each said first index and a control mark of data to be stored in each said storage area can be written in each said second index, said data being accessed by use of the control mark, and said control mark can be changed depending on a data processing.

In this embodiment, when a specification to access a storage area comprises a storage area define information in a first index and a storage area control information in a second index, the storage area control information (mark) is read from the index area of the storage area to check the access condition. If the storage area control information constitutes a predetermined condition, the storage area control information is updated.

Since the program in the control section includes an address calculation procedure for an indexed information, the system of the IC card need not be changed depending on the usages thereof, which enables the IC card to be applied to general purposes and hence leads to the reduction of the cost and the period of time required for the delivery of the IC card.

According to appropriate values and sequence depending on the use of IC card, the user can allocate the storage areas by use of the parameters such as the record length, the number of records, and the start address (first address), which improves the utilization efficiency of the limited storage capacity and increases the data processing speed (throughput).

In addition, an appropriate access enable condition can be set for each storage area depending on the utilization status of the IC card; moreover, such a condition can be independently set and updated for each storage area according to the application of the IC card. Consequently, the data security is guaranteed for each storage area and the storage areas can be efficiently controlled with a high reliability.

BRIEF DESCRIPTION OF THE DRAWINGS

The present invention will be apparent from the following detailed description taken in conjunction with the accompanying drawings in which:

FIG. 13 is a conceptual diagram illustrating the configuration of IC card information processing in another embodiment of the present invention;

FIG. 15 is a schematic diagram showing in detail an index area of the group of index areas of FIG. 14;

FIG. 23 is a flowchart depicting in detail the key check step of FIG. 22.

DESCRIPTION OF THE PREFERRED EMBODIMENTS

Figure 1:
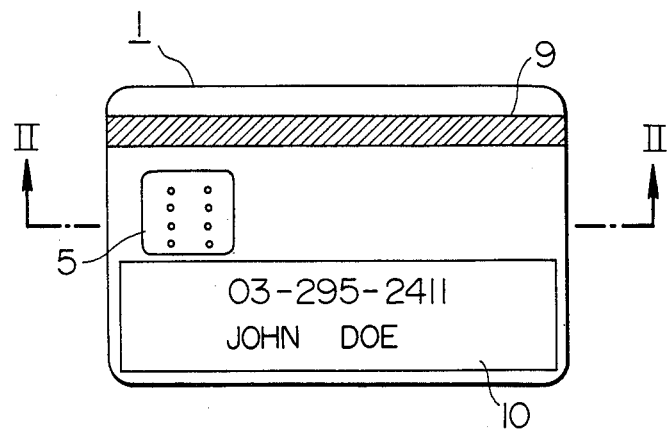
FIG. 1 is an appearance of an IC card.
Figure 2:
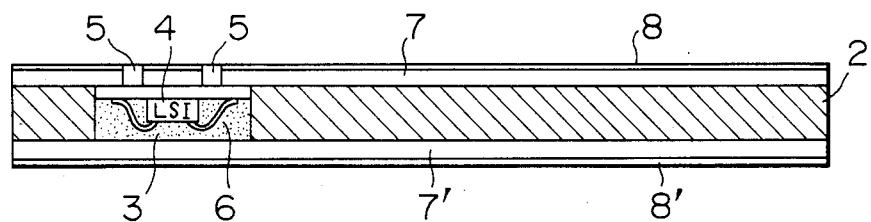
FIG. 2 is a cross-sectional diagram of the IC card along line II—II.

FIG. 1 is a front view showing an appearance of an embodiment of an IC card according to the present invention, whereas FIG. 2 is a cross-sectional view illustrating an internal configuration of the IC card. The IC card 1 includes a card core 2 formed with a material, for example, plastics having a cavity 3 as a portion thereof, and an IC module 4 is housed in the cavity 3. The IC module 4 contains one or two large-scale integration (LSI) chips and is provided with eight connecting terminals 5, which are used to electrically connect external circuits to electronic circuits included in the IC module 4.

To protect the IC module 4, the cavity 3 is filled with a packing material 6, print layers 7, 7 are fixed onto the upper and lower surfaces of the card core 2, and graphic images, characters and the like are printed on the surfaces of the print layers in many cases. The print layers are covered with surface layers 8, 8 for protection thereof.

In FIG. 1, the thickness of the IC card 1 is particularly exaggerated, namely, in the actual card, the card core 2, the print layer, and the surface layer has thickness of 0.55 mm, 0.1 mm, and 0.02 mm, respectively and the entire thickness of the IC card is about 0.8 mm.

In this diagram, a magnetic stripe 9 and embossed characters 10 are to be added depending on the usage of the IC card, that is, these items are not indispensable for the IC card.

FIGS. 1-2 show only an example and hence the IC card to which the present invention is applicable is not restricted by the instantiated card. The outer form, dimensions, and a method for electrically connecting the IC card to external units can be changed or modified in various fashions by those skilled in the art according to the well known technologies.

Figure 3:
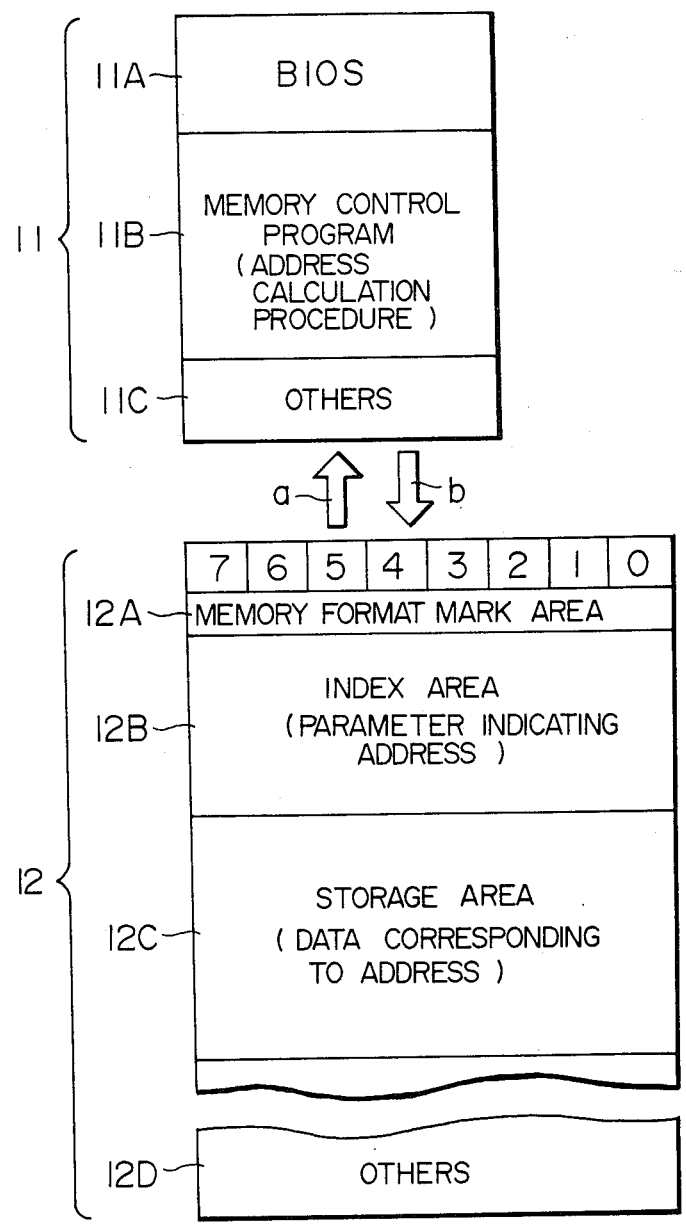
FIG. 3 is a schematic diagram showing a structure of information processing in the IC card according to the present invention.

FIG. 3 is a schematic diagram illustrating the structure of information processing in the IC card according to the present invention in which a control section 11 includes a basic input output system (BIOS) 11A supporting the basic input/output routines, a memory control program 11B, and others 11C. Reference numeral 12 indicates a storage section functioning as a writable memory means which comprises a memory format mark area 12A indicating whether or not information is stored in the memory, an index area 12B, a storage area 12C, and others 12D. Arrows a and b denote communications of instructions and data between the control section 11 and the storage section 12.

The memory control program 11B includes an address calculation procedure to attain an address corresponding to a desired data. For the address calculation, the parameters indicating the address and stored in the index area 12B, namely, the start (first) address of the storage area, the number of records, and the record length are used, thereby accessing the data stored in the storage area 12C at the address corresponding to the parameters.

Figure 4:
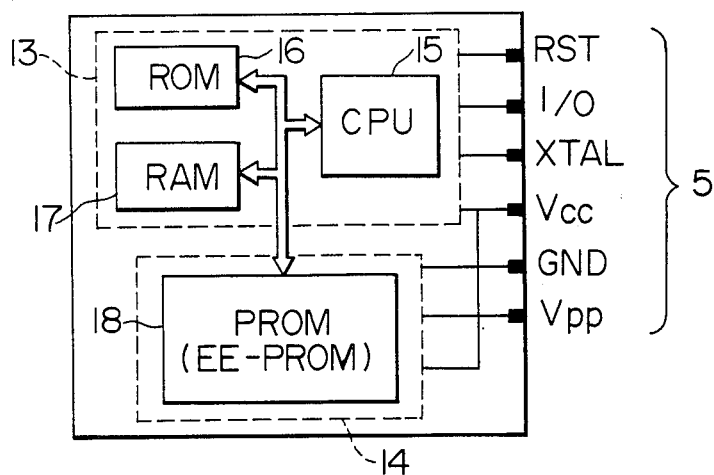
FIG. 4 is a schematic block diagram illustrating an example of the circuit configuration of the IC card.
Figure 5:
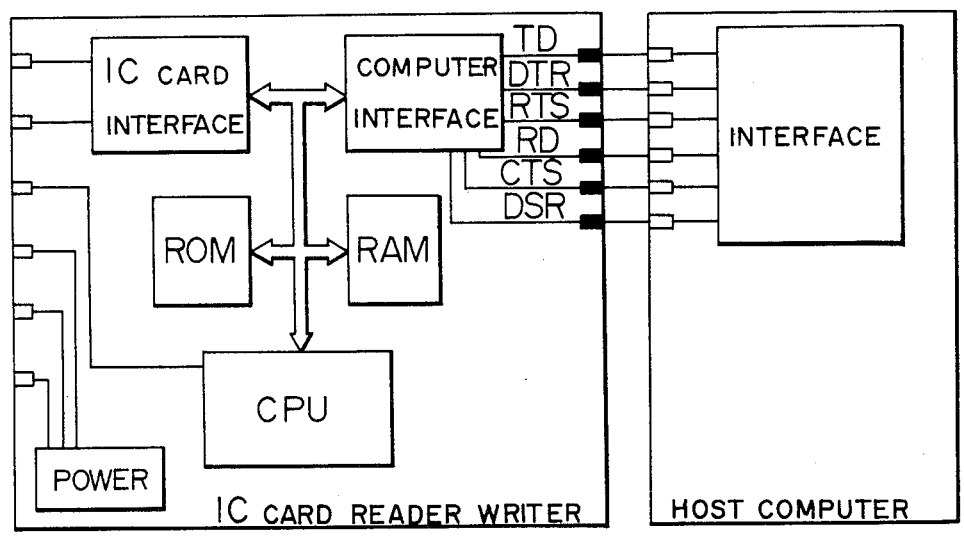
FIG. 5 is a schematic block diagram depicting the IC card reader writer in which an IC card is inserted for the use and a host computer thereof.

The circuit configuration of the IC card is shown in FIG. 4 in which the IC card of an embodiment of the present invention includes a one-chip CPU 13 having the control section 11 of FIG. 3 and a PROM chip 14 containing the storage section 12 of FIG. 3. The one-chip CPU 13 may comprises a CPU 15, an ROM 16, and an RAM 17. The PROM chip 14 and the CPU chip 13 are connected to the connecting terminals, respectively. The IC card is connected to a host computer via an IC card reader writer as shown in FIG. 5.

The IC card of the present invention is not limited to the two-chip configuration as described above but it can also be constructed in a one-chip configuration. In this case, the one-chip structure includes the control section 11 and the storage section 12. Moreover, for the configuration equivalent to the PROM 18 of FIG. 4, an EPROM whose data is erased by use of ultraviolet radiation (when embedded in an IC card, data stored therein cannot be erased unless a window passing such ultraviolet radiation is provided), an EEPROM of which stored data is erasable, or the like can be used.

Next, the storage section 12 of the IC card of FIG. 3 will be described in detail with reference to other drawings.

Figure 6:
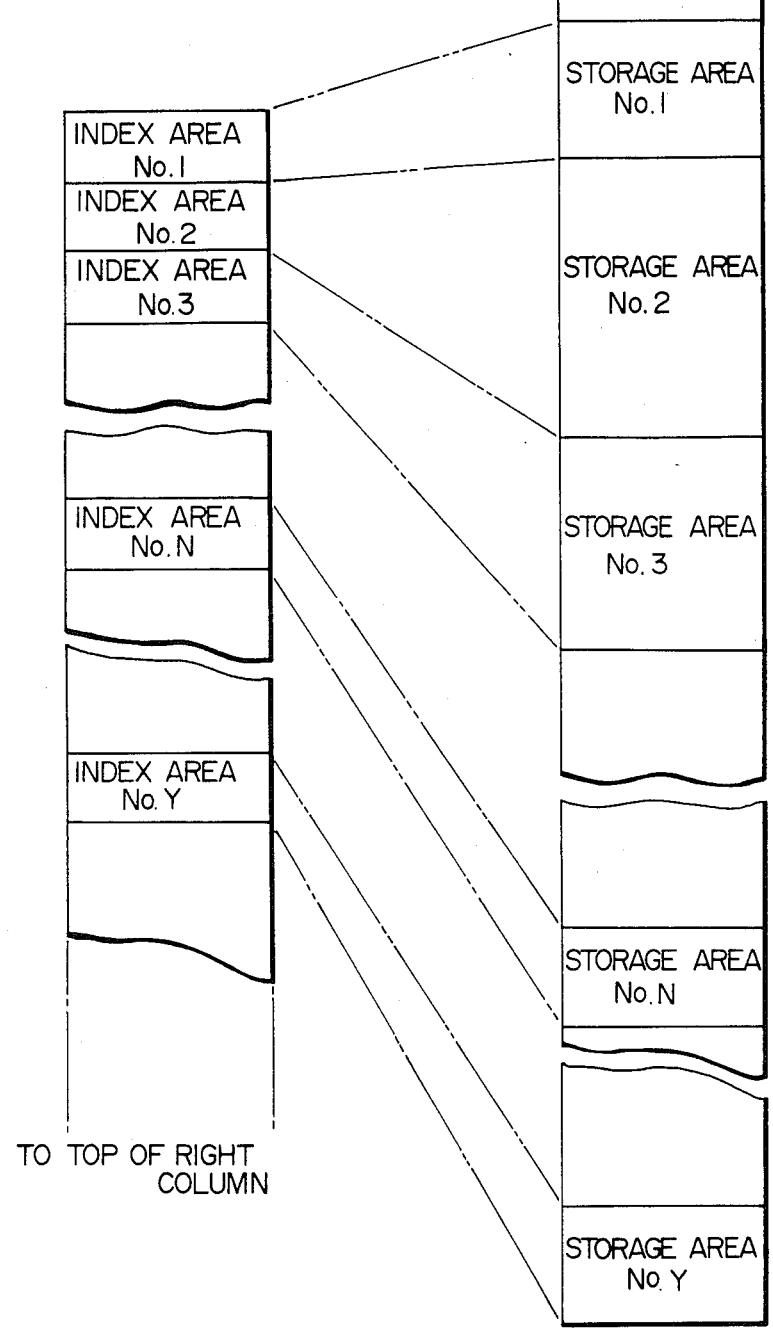
FIG. 6 is a diagram showing allocation of a writable storage.
Figure 7:
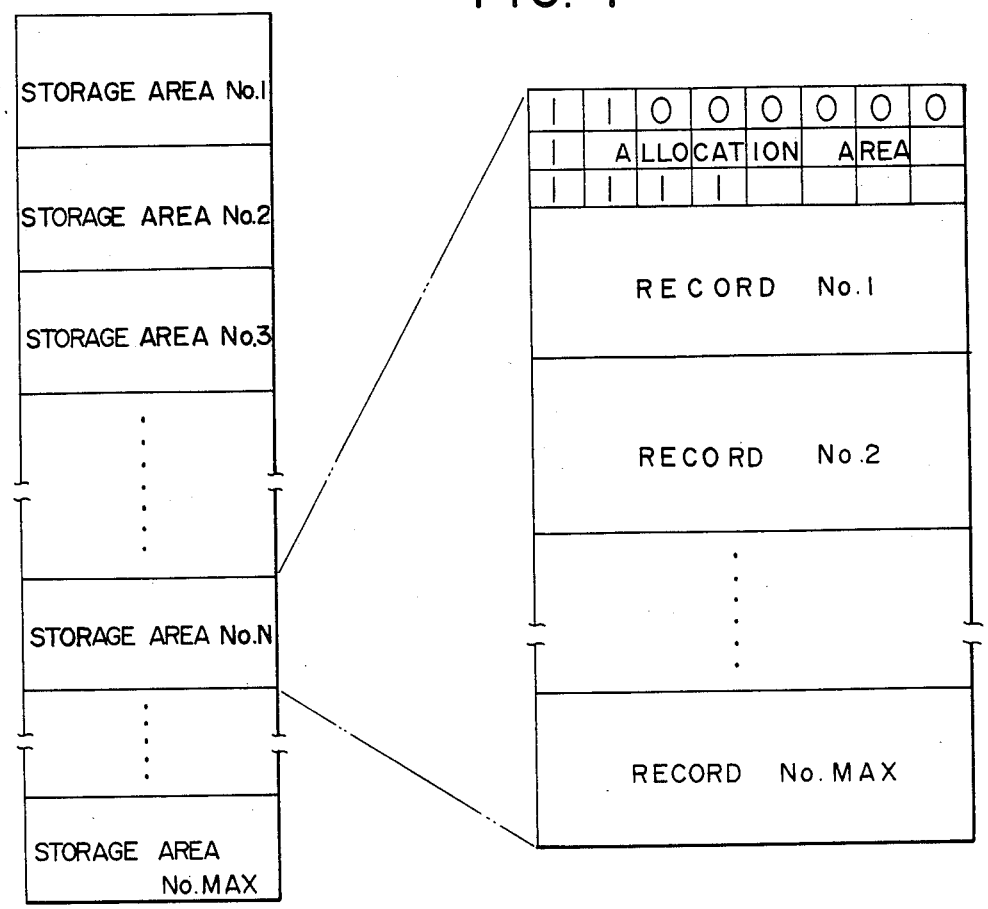
FIG. 7 is a schematic diagram illustrating detailed allocation of a storage area.

FIG. 6 is a schematic diagram showing a memory map in detail of a portion of the storage section of FIG. 3. In FIG. 6, an arbitrary number of index areas are provided beginning from index area No. 1, while the equal number of storage areas are correspondingly arranged beginning from storage area No. 1. FIG. 7 is a diagram illustrating in detail a memory map of each storage area storing records or data items, where the maximum number of records to be stored is indicated by the maximum number of records set to the associated index area.

Figure 8:
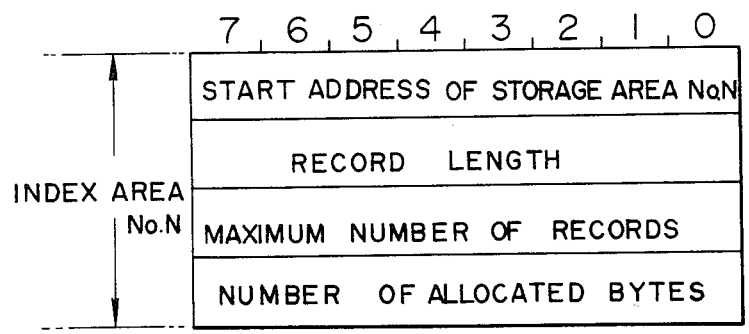
FIG. 8 is a diagram schematically depicting the structure of an index area.

FIG. 8 is a schematic diagram illustrating an embodiment of an index area map. In this embodiment, an index area is used to write therein the start address of N-th storage area, the record length (in bytes) thereof, the maximum number of records, and the number of bytes allocated. The record length and the maximum number of records can be arbitrarily set to each index area depending on the data type. For example, in the example described above, the record length and the maximum number of records can be set to 15 bytes and 3 bytes, respectively for the data of name; whereas, they can be set to 1 byte and 1 byte, respectively for the data of sex. The allocation area is used to maintain the number of records actually written, and the number is expressed by use of bits. This will be further described with reference to FIG. 7. An allocation area is located at the beginning of each storage area in which the bits thereof is marked by changing the value from "1" to "0" as the records are sequentially written, i.e., record No. 1, record No. 2, record No. 3 and so forth. By counting the number of bits thus marked to be "0", the number of records stored in the storage area can be confirmed. The number of allocation bytes in the index area of FIG. 8 is an integer obtained by dividing the maximum number of records by eight (one byte) and by rounding up the fraction of the resultant value, and is equal to the number of bytes constituting the allocation area. That is, in the example of FIG. 7, the maximum number of records and the number of records currently existing in the storage area No. N are 20 and 6, respectively, and hence the number of allocation bytes is obtained as; $20 \div 8 = 2$ with a remainder of 4, so the number is 3 (bytes).

In FIG. 3, the memory format mark area 12A located at the beginning of the storage section 12 is a one-byte area in which various marks can be set when necessary. For example, a bit of the byte may be used as an index close bit to indicate whether or not the preset number of index areas are entirely written in which "1" is set for an index area not written and "0" is set for an index area written. In this case, by checking the bit before a write operation is conducted on an index area, such errors as a duplicated write of the index area ca be avoided. In addition, this provision also prevents an additional write operation that causes the preset number of data items to be exceeded.

Figure 9:
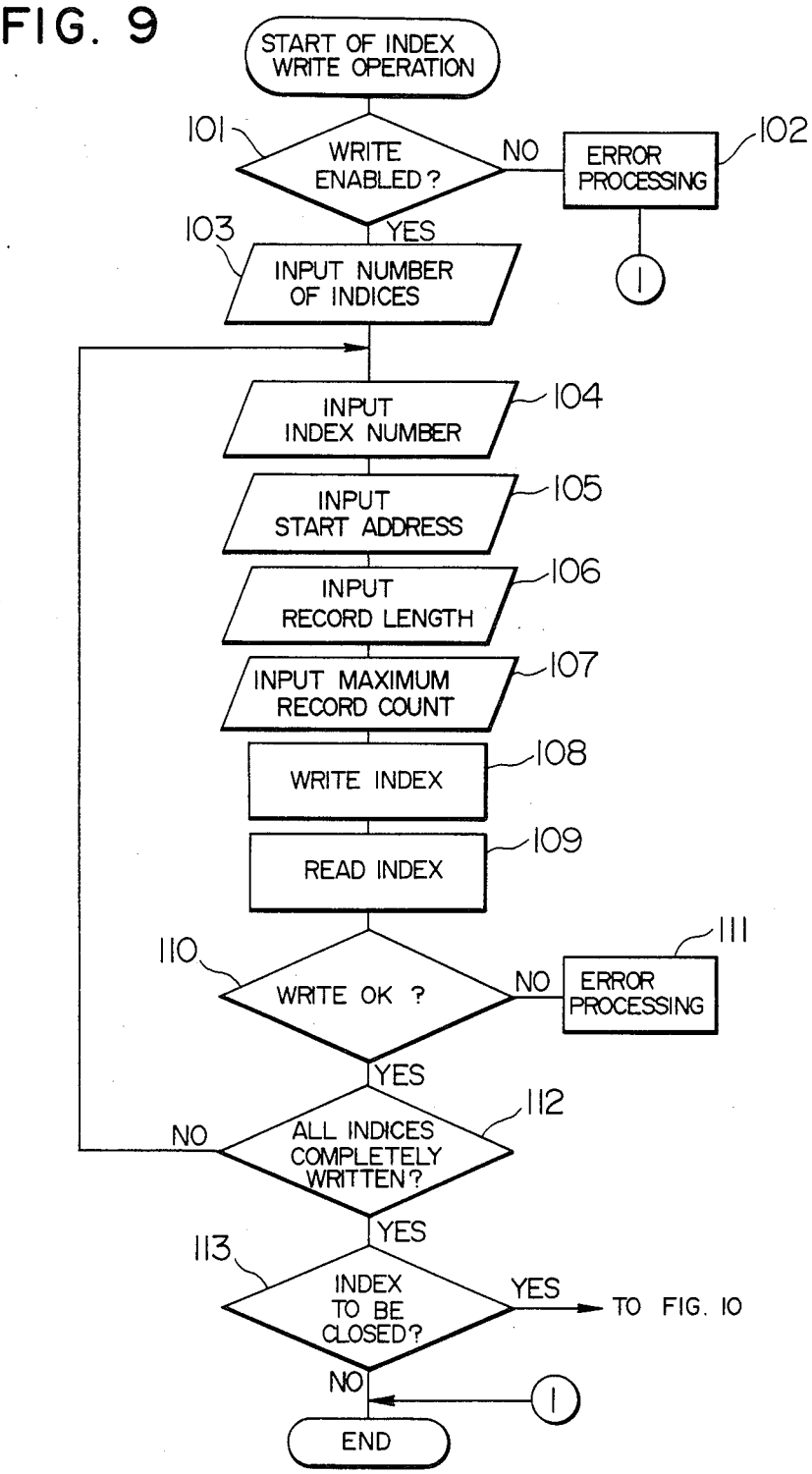
FIG. 9 is a flowchart showing a processing flow to write data in an index area.

A procedure to write data in an index area will be described with reference to FIG. 9. When a write operation on an index area is instructed, step 101 checks whether or not the index is in the write enabled state. This is accomplished by checking the index close bit of the memory format mark area described above. If the index has already been written, an error results and the write operation is not executed; otherwise, the preset number of indices is inputted in step 103. The number of indices is equal to the number of index areas shown in FIG. 6. Next, in step 104, the index area number associated with the storage area to be first recorded is inputted. Index parameters including the start address of the storage area, the record length, and the maximum number of records are then inputted in steps 105-107. The inputted parameters are not directly inputted to the storage area of the PROM, namely, they are temporarily stored in the memory of the IC card reader writer or the memory area of the IC card RAM 17. In step 108, the index parameters are written in the index area of the PROM 18 at a time. In step 109, to confirm whether or not the index parameters have been correctly written, the index parameters are read from the index area. In step 110, the obtained parameters are checked against the parameters temporarily stored in the steps 103-107. If an error is found, an error processing is achieved in step 111, and then the parameters are to be inputted again. If the written parameters are correct, step 112 checks whether or not the specified index area have been completely written. This processing flow is repeated as many times as there are inputted indices to write the parameters in all index areas. In step 113, even if there exist unwritten indices for which a write operation is not instructed, it is determined whether or not the index close bit to be explained in the following paragraphs is to be marked. If the close is not desired, additional data can be written thereafter; if the close is requested, control is passed to the processing flow of FIG. 10.

Figure 10:
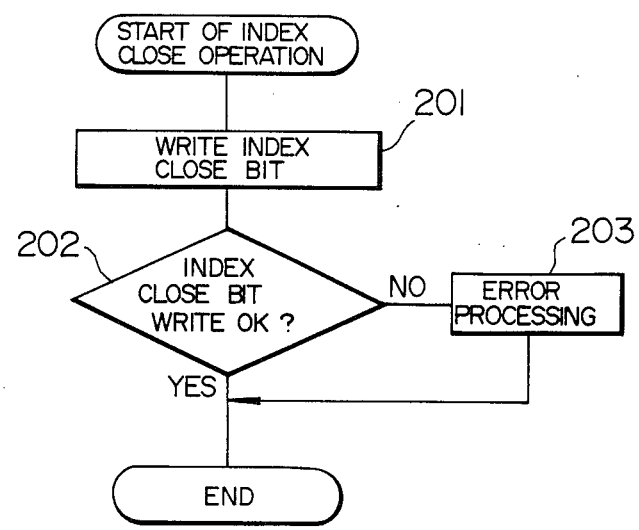
FIG. 10 is a flowchart illustrating a processing flow to write an index close bit.

FIG. 10 is a flowchart demonstrating a write operation of the index close bit used in the step 101 of FIG. 7 to determine whether or not the index area has already been written. When the index parameters are written in all index areas specified, the close bit of the memory format mark area is marked, namely, changed from "1" to "0" in step 201. Step 202 then checks to determine whether or not the close bit has been written, thereby completing the processing.

Figure 11:
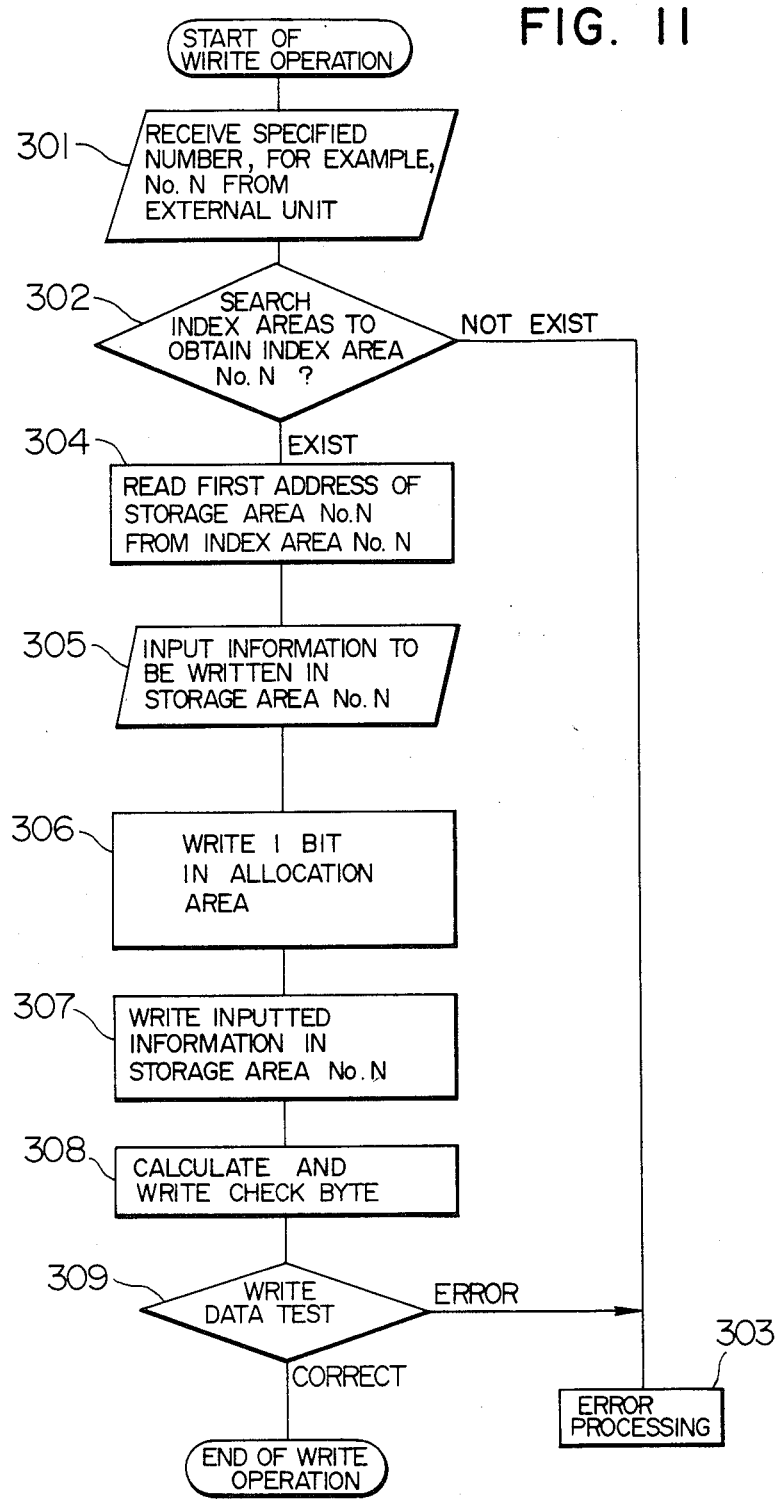
FIG. 11 is a flowchart depicting an embodiment to write data in a storage area.

After the index parameters are written in the predetermined number of index areas as described above, data is recorded in each storage area corresponding to the respective index area. The data is recorded according to the procedure shown in FIG. 11, for example.

When a data write operation is instructed, a number (No. N) of a storage area on the card side in which data from an external unit, for example, the host computer is to be written is specified in step 301. In the next step 302, the program checks to determine whether the pertinent storage area is found or not. If not found, an error processing is executed in step 303; otherwise, the first (start) address of the specified storage area No. N is read from the index area No. N corresponding thereto in step 304. In step 305, the data to be written is inputted from the host computer. The inputted data is temporarily stored in a storage, for example, of the IC card reader writer. Next, a bit is written in the allocation area in step 306. Then, the data inputted in the step 306 is written in the storage area No. N of the IC card in step 307. Step 308 is a step to write in an area (not shown) of the check byte a code (check byte) for checking an error in a data read operation; however, since this step is not directly related to the gist of the present invention, the detailed explanation thereof will be omitted. Step 309 checks to determine whether or not the written data matches the input data. If unmatched, an error processing is executed; otherwise, the write operation is terminated.

Next, a procedure to read stored data will be described with reference to FIG. 12.

Figure 12:
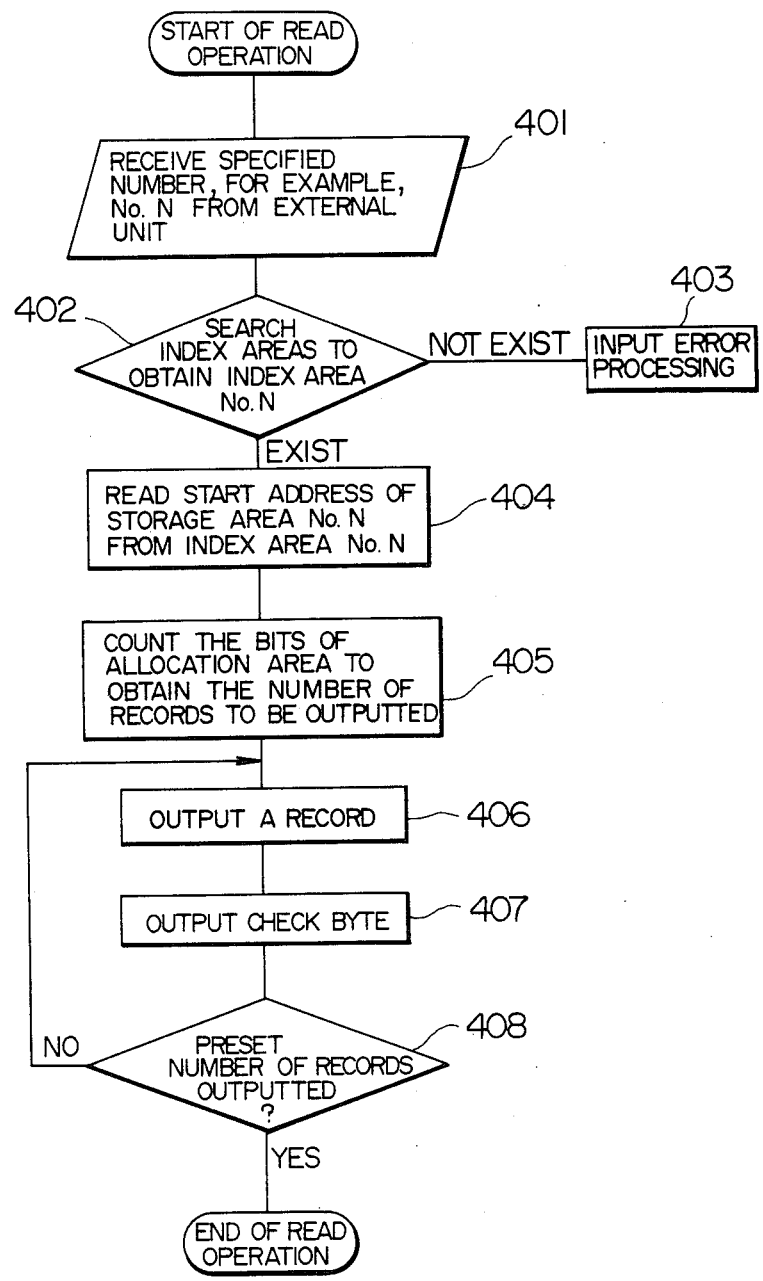
FIG. 12 is a flowchart showing an embodiment of a data read operation.

FIG. 12 is a flowchart illustrating an embodiment of a data read operation. When a data read is instructed, a number (No. N) of a storage area associated with the data to be read is specified by an external unit, for example, the host computer in step 401. In the next step 402, the program checks to determine whether or not the pertinent storage area is present. If not present, an error processing is executed in step 403; if the storage area No. N is present, the first (start) address of the storage area No. N is read from the index area No. N corresponding thereto. In step 405, the bits of the allocation area are counted to obtain the number of records to be read. In step 406, a record is read from the storage area. The check byte for determining whether or not the record has been correctly read is read in step 407, which is not directly related to the gist of the present invention and will not be described. Step 408 checks to determine whether or not the predetermined number of records is reached and the records are repeatedly read from the storage area, the number of records to be read being specified by the value obtained in step 405.

Next, another embodiment of the present invention will be described.

FIG. 13 is a conceptual diagram illustrating the configuration of the information processing in an IC card according to the present invention. The fundamental configuration is identical to that of FIG. 3 and includes a control section 21 having therein a BIOS 21A, a memory control program 21B, and others 21C.

The memory control program 21B contains as programs an address calculation procedure for arranging a plurality of storage areas in the storage area section as described in the following paragraphs and a procedure for updating a storage area control information to be described later.

Reference numeral 22 indicates a writable memory means or a storage unit, which includes an index area 22A, a storage area 22B, and others 22C. This is different from FIG. 3 in that the memory control program 21B contains a control mark update procedure as a program and the index area 22A is divided into areas of define information and control information. For the PROM 18 of the IC card, an EEPROM allowing a rewrite operation is used.

The others section 22C is a memory area which can be accessed independently of the index area 22A and stores fixed or variable information, for example, a Chinese character dictionary for indicating input/output procedures and other general information.

Figure 14:
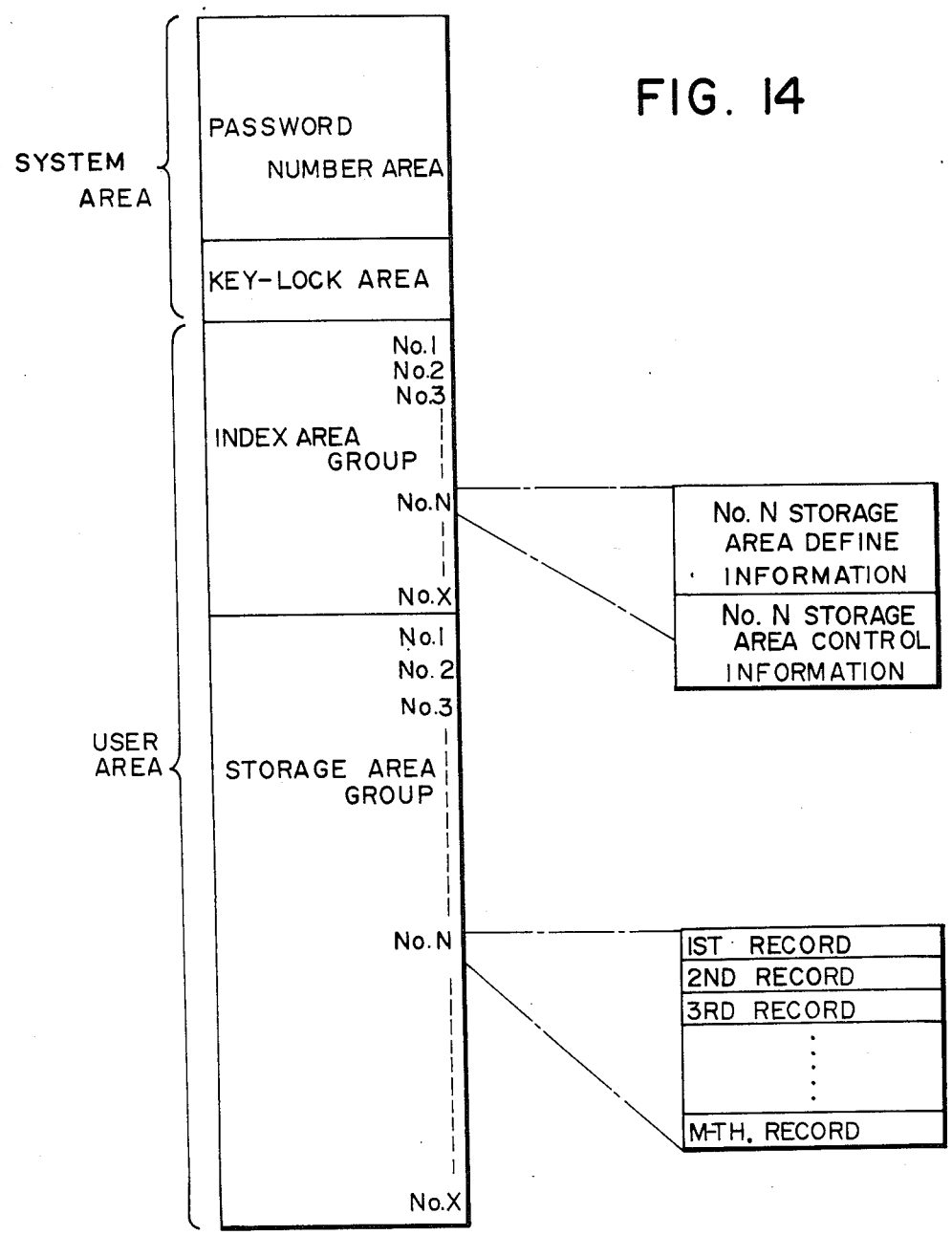
FIG. 14 is a schematic diagram depicting the memory layout of the embodiment of FIG. 13.

FIG. 14 is a schematic diagram showing a memory configuration of the embodiment. This configuration includes a system area for storing information to control the overall IC card and a user area for storing and defining information to be actually recorded. In the embodiment of the present invention, the system area includes a password number area for storing a password number used for the IC card and a key lock area to be described in details later. The password number may be a personal key which is a password number specifying the card user, a control key used by an enterprise to control specific data, an enterprise key for specifying relationships between data and enterprises, or an issuer key for specifying the issuer of the complex IC card. In more detail, the control key is a password number (key) necessary for the manager of an enterprise to use the card and only the manager possesses information thereof. The enterprise key is used to specify which enterprise can use information recorded in a storage area and is set for each storage area, and only the enterprise has information about this key. Consequently, there are the enterprise keys as many as there are enterprises related to the complex IC card. The user area comprises a group of storage areas (X in number) and a group of index areas (also X in number) allocated corresponding to the storage areas. As instantiated by index area No. N on the right-half of FIG. 14, each index area is divided into fields of a storage area define information and a storage area control information (mark). An index section of the storage area define information contains information related to a store location or an address of the storage area, whereas an index section of the storage area control information contains information such as a condition to access the storage area and an attribute of data to be stored in the storage area. These items will be described again in explanation of FIG. 15 later. As instantiated by storage area No. N in FIG. 14, each record area is divided into fields of the first, second, . . . , and m-th records, where m is an arbitrary number. Consequently, the information is stored for each record, and the record length (in bytes) is beforehand set and is written as a storage area define information of the associated index area.

FIG. 15 is a schematic diagram illustrating in detail the configuration of index area No. n corresponding to storage area No. n in the user area of FIG. 14 The first and second bytes of the storage area define information of FIG. 15 are used to define the storage area start address. This indicates the first address of storage area No. n. The third byte is used to define a write security level, WSL for a write operation and a read security level, RSL for a read operation. If the security level varies depending on the content of information, the types of password numbers necessary to access such information are set according to the security level. In other words, the security level data defines the password numbers with which the information of the storage area can be accessed. In this embodiment, the security level is defined by four bits in which the most-significant bit specifies the necessity/unnecessity of the enterprise key and three low-order bits specify the necessity/unnecessity of the personal, control, and issuer keys, respectively. For example, the write and read cases can be respectively defined as follows.

| Most-significant bit | 0: | Exterprise key required |
| | 1: | Enterprise key not required |
| Three low-order bits | 001: | Only personal key required |
| | 010: | Only control key required |
| | 011: | Personal or control key required |
| | 100: | personal and control keys required |
| | 101: | Only issuer key required |
| | 111: | Password number not required |

If the number of passwords used in the card system increases, the number of bits for the security level specification need only be increased to cope with such a condition.

The fourth and fifth bytes are used to define the kinds of enterprise keys necessary for the write and read operations, respectively. In this embodiment, since eight bits are assigned, eight kinds of enterprises can be defined. That is, eight enterprises can be registered to the complex IC card. To increase the number of enterprises related to the card system, the number of bits need only be increased or each enterprise need only be defined by a combination of bits. The definition of enterprise key level may vary between the read and write operations depending on the contents of the information. In this definition, each bit of the eight bits is associated with an enterprise. For example, the 0-th bit to the fourth bit indicate bank A, department store B, hospital C, finance company D, and bank E, respectively. If "0" is written in the bit, the enterprise key is required; if "1" is written therein, the enterprise key is not required. Assume the following enterprise key level to be defined.

| 7 | 6 | 5 | 4 | 3 | 2 | 1 | 0 |
|---|---|---|---|---|---|---|---|
| 1 | 1 | 1 | 0 | 1 | 1 | 0 | 0 |

Under this condition, to access the storage area, the enterprise key of bank E, department store B, or bank A must be inputted.

Figure 16:
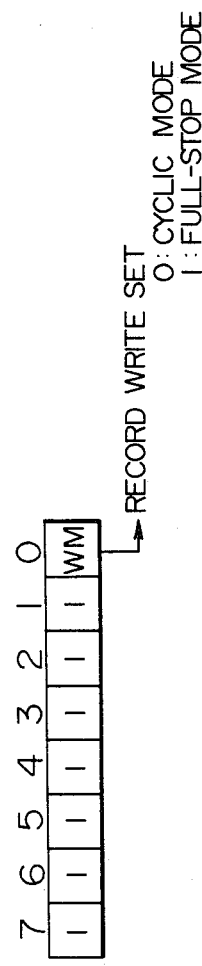
FIG. 16 is a diagram schematically illustrating an example of a storage area mode byte.

The sixth byte defines the record length as described above, whereas the seventh byte defines the number of records (m in FIG. 14) which can be stored in the storage area. Among these items, the define data items of the storage area start address, the record length, and the number of records are used as parameters to calculate an address to access the storage area. As an example of the address calculation, the end address of a storage area is indicated by "storage area start address + (record length × number of records)" and the start address of the n-th record is the next address of an address obtained from this expression with the number of records set to n−1. When the number of records in the storage area is one, the record length and the number of records can be obtained by specifying the end address of the storage area. If a plurality of records are contained in the storage area, the record length and the end address need only be specified. These index parameters may by arranged corresponding to the respective storage areas thereby to be arranged corresponding to respective enterprises. The eighth byte includes bits for specifying the cyclic write mode or full-stop write mode to a storage area. In the cyclic write mode, if the storage becomes full of data, the oldest record (at the youngest address number) is deleted and a new data is stored therein, that is, the records are deleted from the oldest record to store the new records. In the full-stop write mode, new data cannot be stored if the storage area become full of data. In the eight byte, the mode is specified by setting a bit to "1" or "0". FIG. 16 is a diagram illustrating an example of the storage area mode byte. The ninth and tenth bytes are storage area identification bytes in which an arbitrary name corresponding to the storage area number of the storage area is written. Namely, although an access to the storage area is instructed by use of the storage area number in ordinary cases, the name recorded in these bytes may also be specified to indicate the storage area to be accessed.

Figure 17:
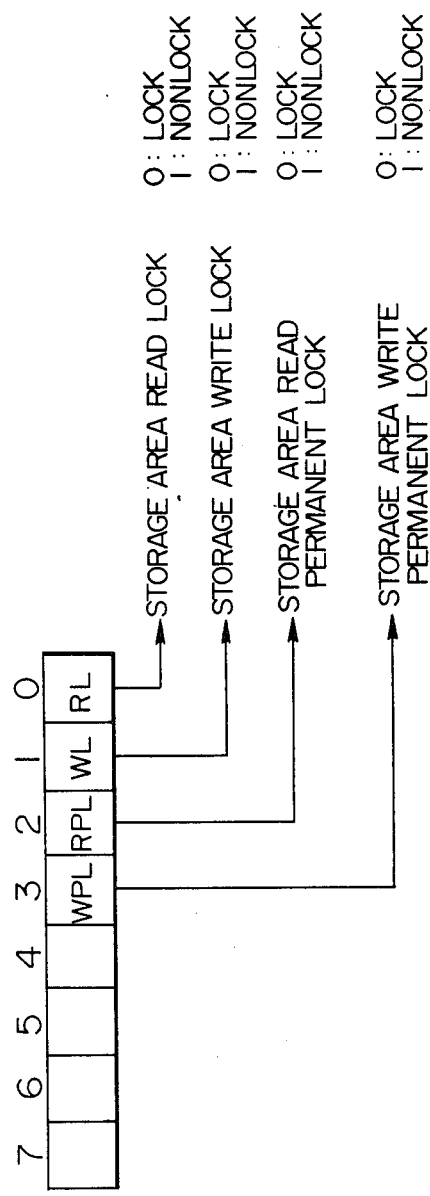
FIG. 17 is a schematic diagram depicting a storage area status byte.

Two low-order bits of the 11th byte of the storage area control information (mark) are used to write therein the number of error inputs of password number in a write operation. Two low-order bits of the 12th byte of the storage area control information stores the number of error inputs of password number in a read operation. The 13th byte thereof is a kind of address pointer specifying the number (address) of the next record to be written in the operation of the cyclic write mode. The most-significant bit of the 14th byte indicates whether or not the storage area is full of records (i.e., all the preset number of records are written). The remaining low-order bits of the 14th byte are storage area status bytes in which a storage area lock bit preventing accesses to the storage area when the key error count is equal to three and a permanent lock bit permanently preventing accesses to the storage area are defined. These lock bits are defined each for a read operation and a write operation, respectively. Five high-order bits of the 11th and 12th bytes, respectively are used to write therein the counts of releases (unlock operations) effected on the storage area lock bits of FIG. 14 for the write lock and the read lock, respectively. The storage area bit cannot be arbitrarily unlocked, namely, the unlock operation cannot be allowed unless a predetermined password number and a command therefore are inputted. This unlock procedure is designed as a means to unlock a locked state which is caused when an authorized card user or enterprise inputs a wrong password number by mistake. However, if the predetermined number of the unlock operations are executed, for example, 31 times in this embodiment, and if the storage area is set to the locked state thereafter, the storage area is set to the permanent locked state which cannot be unlocked. In this situation, the permanent lock bit of the storage area status of the 14th byte is written. An example of the storage area status byte is shown in FIG. 17. The 15th and 16th bytes of the storage area control information area are used to record therein variable attributes of the storage area. For example, if the value of the byte is updated each time an access (a read or write operation) occurs to the storage area, the number of accesses conducted up to the current point is recorded in the storage area attribute byte. The data of such an access count may be used in a processing to sort the storage areas of the IC card according to the storage area utilization frequency (access count).

Referring now to FIGS. 18-21, the read and write operations of an embodiment of the complex IC card according to the present invention will be described.

Figure 18:
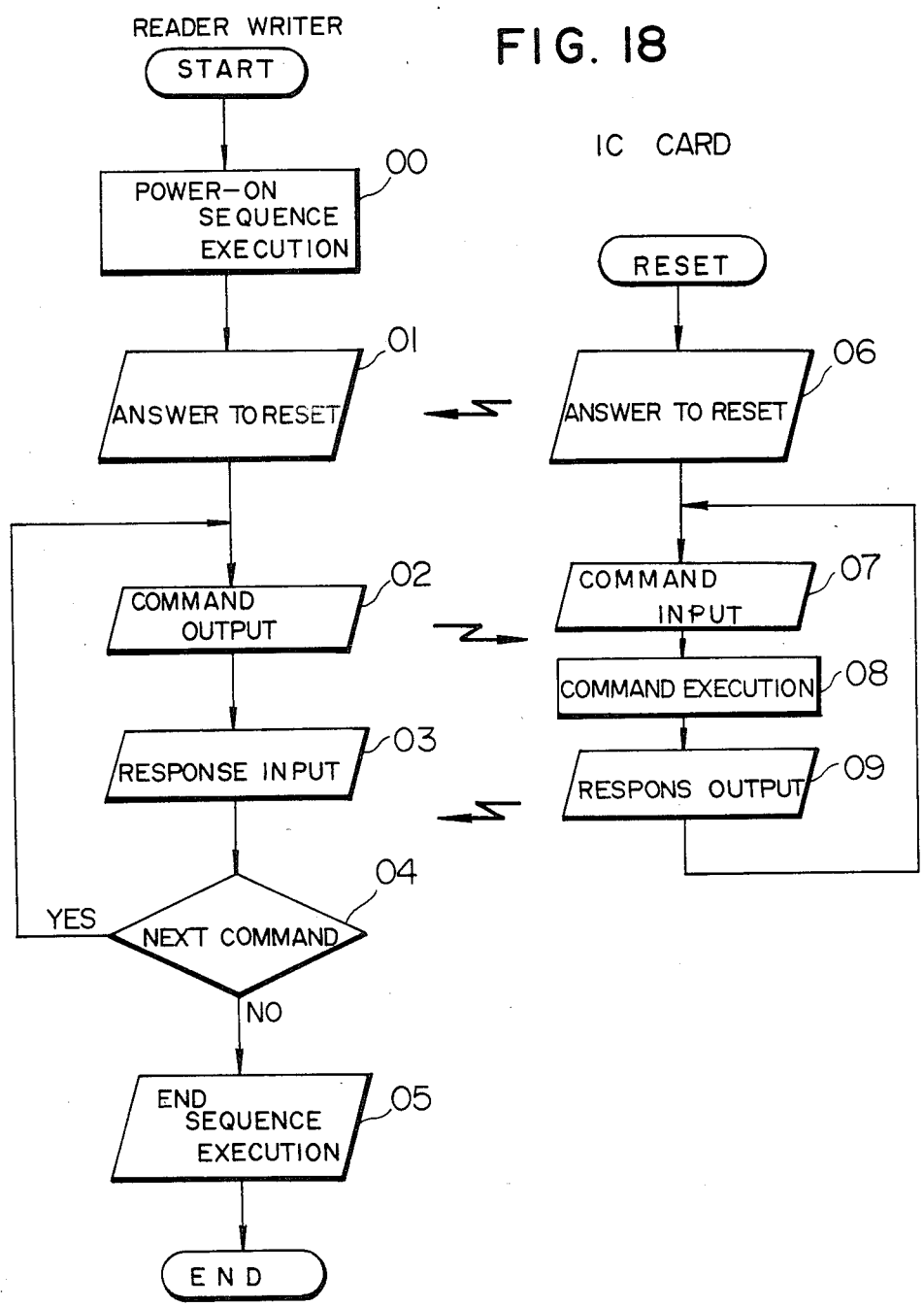
FIG. 18 is a flowchart showing a fundamental flow of processing between an IC card and an IC card reader writer.

FIG. 18 is a flowchart showing the fundamental flow of operations between the IC card and the reader writer when the host computer and the IC card reader writer of FIG. 5 are connected to the IC card of FIG. 4. The IC card reader writer is provided with a card insert slot (not shown) and when a card is inserted into the slot, the electric contact point 5 of the card is connected to a contact point disposed in the reader writer. The connection between the card and the card reader writer is not limited to a metal contact formed with a metal conductor or the like but it may be accomplished by use of means transferring signals between the card and the card reader writer, for example, a noncontact, optical connecting means, acoustic connecting means, or connecting means using electromagnetic induction. When the IC card is inserted into the IC card reader writer and the electric connection is established therebetween, step 00 supplies power to the IC card and then signals such as a clock pulse is sent thereto. When the card is supplied with power and the clock pulse and is set to an operable state, the card notifies the condition to the reader writer in step 06. In step 02, the reader writer transfers a command from the host computer to the card. The system has such commands as to input, read, and write a password number, and for each command, steps 00-09 are executed as shown in FIG. 8. On receiving a command in step 07, the card executes the command in step 8 and transfers the result of the command execution to the reader writer in step 09. On receiving the result of the command execution in step 03, the reader writer checks to determine whether or not the next command from the host computer has been received. If this is the case, control returns to step 02 to repeat the procedure described above. When the command processing is completely finished, the reader writer stops the power to the card to terminate the operation of the IC card and performs necessary operations, for example, to display the condition that the processing has been completed.

Figure 19:
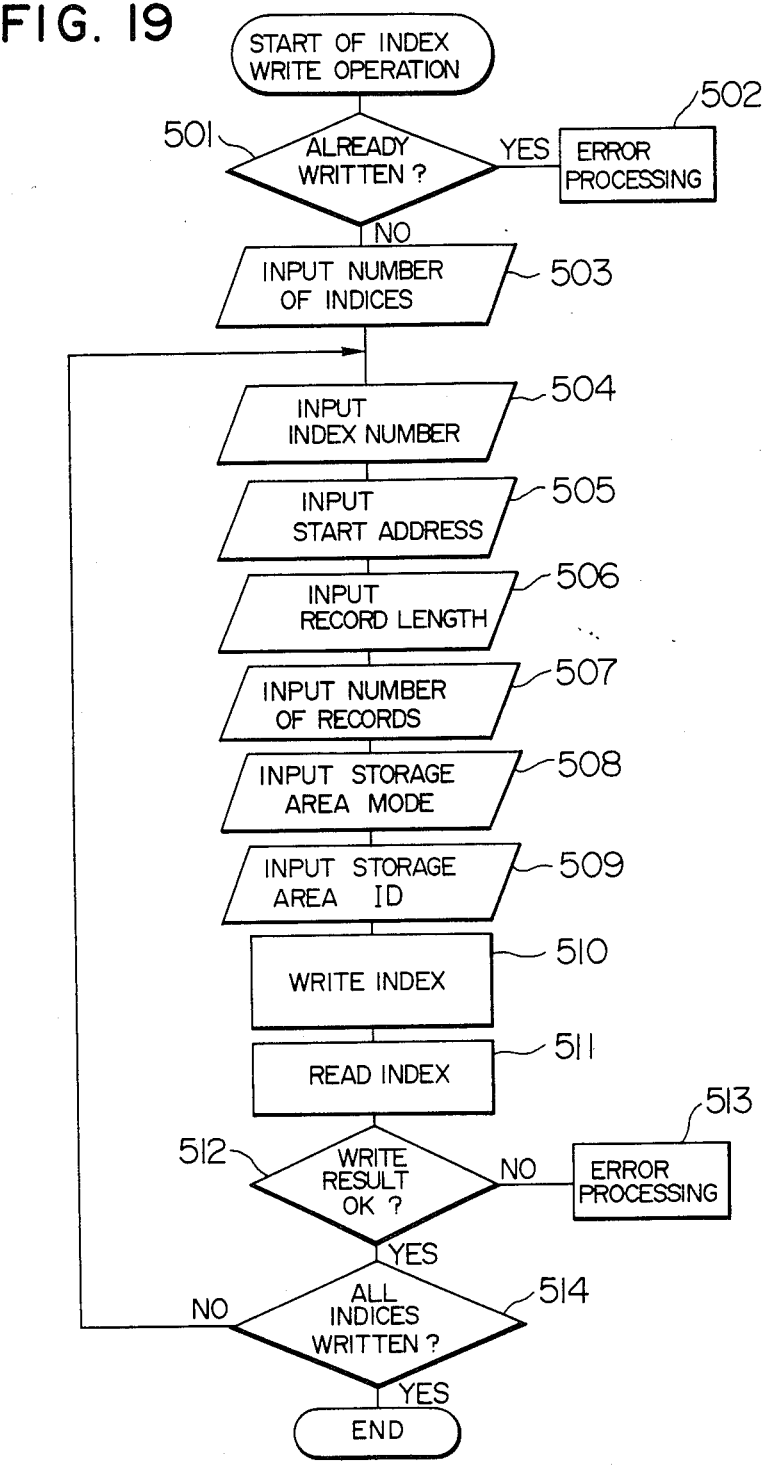
FIG. 19 is a flowchart illustrating a procedure to write a storage area define information in an index area.

Referring next to FIG. 19, the procedure to write the storage area define information in an index area will be described. When a write to an index area is instructed, step 501 checks to determine whether the index has already been written or not, namely, the program checks for the contents of th index area to be written to determine whether the initial value has been set to the index area. If the index has already been written, an error results and the write operation is not effected. If not written, the predetermined number of indices is inputted in step 503. The number of indices is identical to the number of index areas shown in FIG. 14. In the next step 504, the number of index area corresponding to the storage area to be first recorded is inputted. In steps 505-507, the index parameters including the start address of the storage area, the record length, and the number of records are inputted. These parameters inputted are not directly stored in the storage area of the EEPROM 18 but they are temporarily stored in the memory of the IC card reader writer or in the memory area of the IC card RAM 17. In the next step 508, the associated area is defined to be a cyclic mode area or a full-stop mode area by writing "0" or "1" in the mode indication area. In step 509, a predetermined ID (name) corresponding to the storage area number is written.

Next, in step 510, the index parameters are written in the index area of the EEPROM 18 at a time. In the next step 511, to confirm whether the index parameters have been correctly written or not, the program reads the index parameters from the index area. In step 512, these parameters are checked against the parameters temporarily stored in steps 503-507. If an error is found, an error processing is executed in step 513 and the input operation is to be achieved again; otherwise, step 514 is effected to determine whether or not all specified index areas have been written. The processing flow described above is repeated for each of the inputted indices, thereby completing the operation to write the storage area define information in the index areas.

The operation to write the storage area define information in the index areas is carried out when the IC card is issued, namely, before the card is passed to the user of the card. Next, the operation to write the storage area control information in an index area will be described with reference to FIGS. 20-23. This operation is executed after the card is passed to the user and when the IC card is actually used, and the contents of the card are sequentially updated and changed according to the usages of the IC card.

Figure 20:
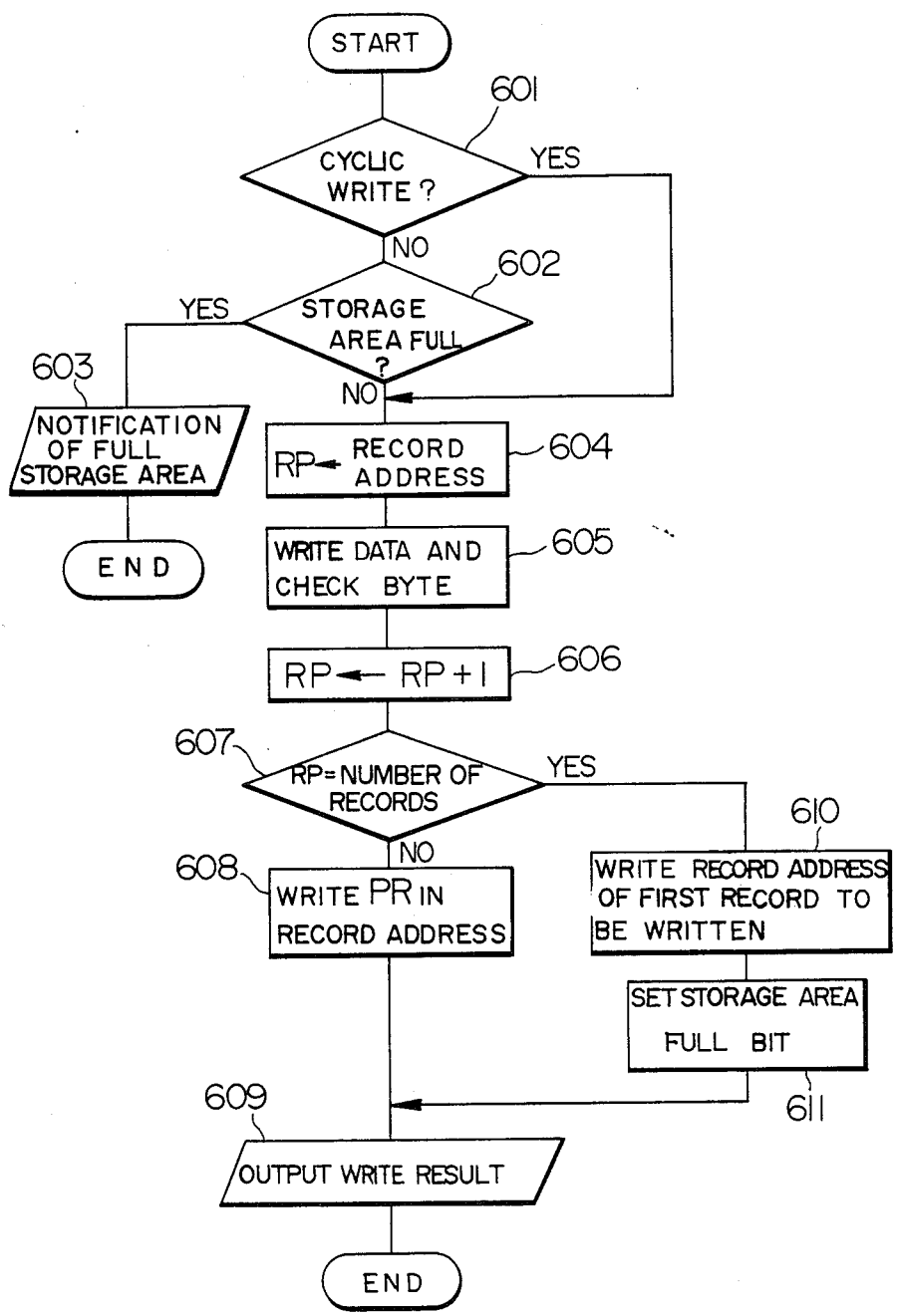
FIG. 20 is a flowchart depicting a data write operation for explaining a usage of a storage area control information.

FIG. 20 is a flowchart showing a processing flow to write data in a specified storage area.

In this flowchart, step 601 first checks to determine whether or not the cyclic write is specified by use of the content of the 0th bit (FIG. 6) of the storage area mode field of FIG. 15. If not, the full-stop mode in naturally assumed, and hence step 602 checks to determine whether or not all the records of the corresponding storage area have already been written by use of the full bit F or the most-significant bit of the storage area status field (14th byte) of FIG. 15. If this is the case, the additional data cannot be written, and hence step 603 notifies the condition that the storage area is full, thereby terminating the processing; otherwise, control is passed to step 604, which is also effected when the cyclic write mode is assumed to be specified in step 601. In step 604, the contents of the record address byte (13th byte) of FIG. 15 are read and moved to the record pointer field of the RAM 17. In step 605, data and the check byte are written in the record specified by the record pointer. In the next step 606, the content of the record pointer is incremented by one to indicate an address where the next input data is to be recorded. Step 607 checks to determine whether or not the result of the increment operation indicates a record corresponding to the record number of the pertinent storage area. If this is not the case, control is passed to step 608 in which the content of the record pointer is written in the record address byte (13th byte in FIG. 15) of the associated index area, and then the result of the write operation is outputted in step 609.

When the decision results in "YES" in step 607, all records of the storage area are assumed to have been written, and therefore the address of the record to be first written in the storage area is written in the record address byte in step 610. In the next step 611, a flag indicating the state that the storage area is full is set to the full bit F or the most-significant bit of the storage area status byte (14th byte) of FIG. 15. In step 609, the result of the write operation is outputted, thereby terminating the processing.

Figure 21:
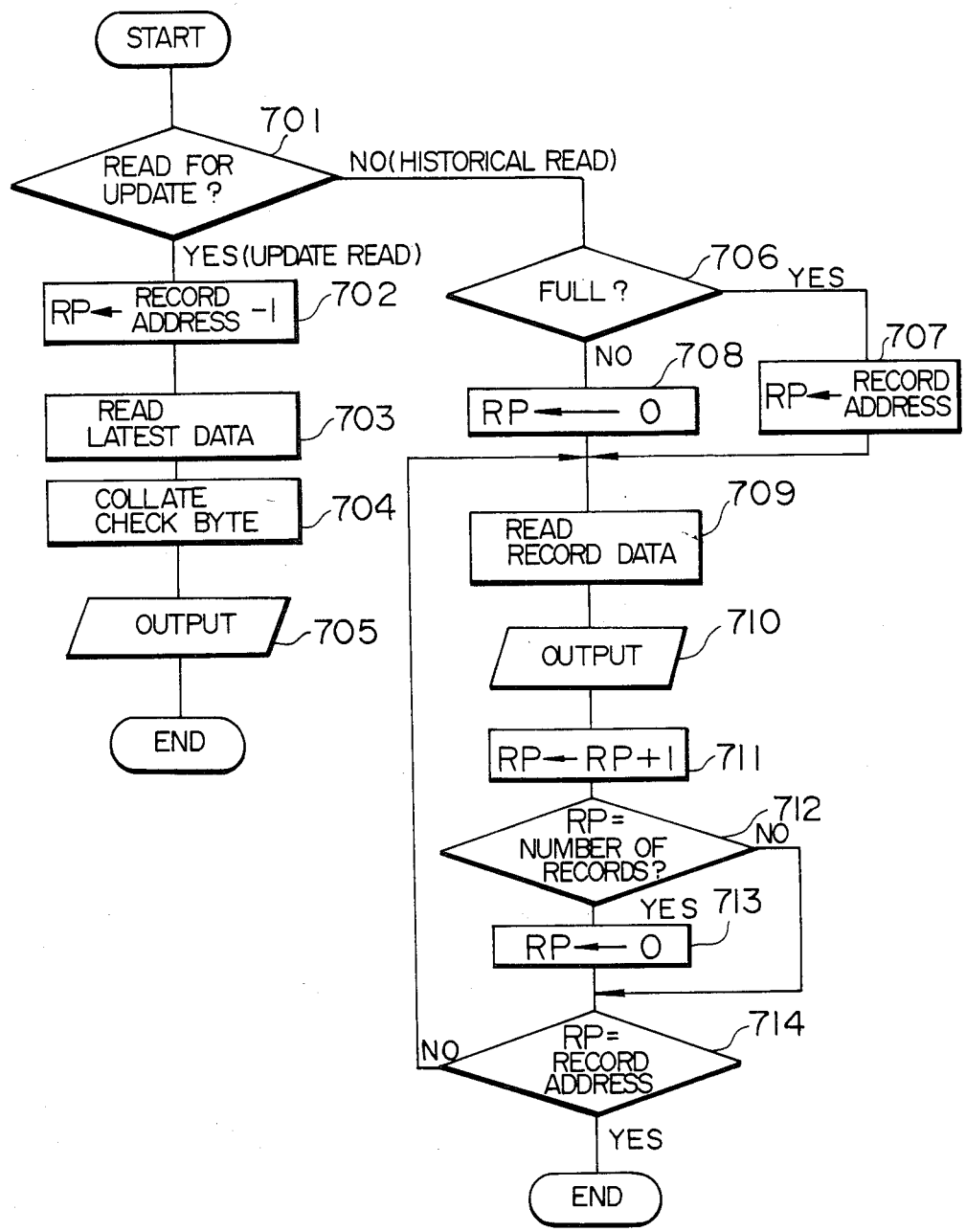
FIG. 21 is a flowchart showing a data read operation for explaining a usage of a storage area control information.

FIG. 21 is a flowchart illustrating a procedure to read data stored in a storage area. First, the reader writer is instructed to read data from the storage area of the IC card. Step 701 checks to determine whether the read instruction is an update read instruction or a historical read instruction. The update read is used to read only the latest record from the records written in the storage area, whereas the historical read is used to sequentially read the records from the storage area according to the sequence in which the records are stored.

If the update read is determined to be specified, step 702 stores in the record pointer the address of the record including the latest data obtained by decrementing the content of the record address byte (13th byte in FIG. 15) so as to read only the latest data. The latest data is then read in step 703. In step 704, the data is checked by use of the check byte to determine whether or not the data is wrong. In step 703, the corresponding latest information is outputted, thereby terminating the processing.

On the other hand, if the decision of step 701 results in "NO", the historical read is assumed to be specified and control is passed to step 706, which checks the full bit F or the most-significant bit of the storage area status byte (14th byte in FIG. 15) so as to determine whether or not the records are completely written to fill up the storage area. If the decision is "YES", since the content of the record address byte indicates the address of the oldest record stored therein, the content of the byte is set to the record pointer in step 707. If "NO" results in step 706, since the cycle of record write operations is not completed, the oldest data has been written in the record having the first sequence number of write operation, and hence the record address of the record is set to the record pointer. In the next step 709, the data of the record specified by the record pointer is read, and the data is outputted in step 710. Subsequently, in step 711, the record pointer content is incremented by one, and the sequence number of write operation of the record specified by the record pointer is checked to determine whether or not to be equal to the number of records. If this is the case (YES), the record of the last sequence number is assumed to have just read, and then step 713 sets the address of the record having the first sequence number to the content of the record pointer and transfers control to step 714. If the decision of step 712 is "NO", control is also passed to step 714. In step 714, the program checks the content of the address pointer to determine whether or not the content is equal to the address (content of the record address byte) of the record in which the next data inputted is to be written. If the decision is "YES", the historical read operation is assumed to have been completed, and hence the processing is terminated. If "NO" results in step 714, control returns to step 709 to read the next record.

Next, an example of an IC card using the 11th, 12th, 15th, and 16th bytes of the storage area control information will be described with reference to FIG. 22.

In the first step 801, the initial setup or initialization is conducted, and then a command and data are inputted in step 802. For example, a necessary password number is inputted, a read instruction and a storage area to be read are specified; and a write instruction, a data item to be written, and a storage area in which the data item is written are inputted. Step 803 checks to determine whether or not the password number (key) has been received. If this is the case, the password number is checked for availability, namely, whether or not the key lock has been set thereto in step 804. The key lock is used to prevent an illegal utilization of the password number and is different from the lock to prevent an access to a storage area, that is, the use of the password number is prevented. If an unmatched condition successively occurs the preset times, for example, 15 times between an inputted password number and the personal key, control key, issuer key, or enterprise key(s), the password number is subjected to the key lock operation and is set to be unavailable. For the key lock, a key lock area is allocated to the system area of FIG. 14 for each password number, and when the number of unmatched conditions of a password number reaches 15, the key locked state indication is written in the pertinent key lock area. In step 804, the key lock area of the system area is read and is checked for key locked state with respect to the inputted password number. If the key locked state has been indicated, the card cannot be processed with the password number, and hence an error is notified to be displayed via the reader writer in step 805. Other errors are also displayed in the similar fashion. The program then waits for a new command (instruction) to be inputted. If the key locked state has not been set, the system area is read to collate the password numbers in step 806. In step 807, completion of the collate operation is notified, the result (match or unmatch) of the collation is temporarily stored in the RAM 17, then the program waits for the next command. Control returns to step 802 in which if a read command comprising, for example, a read command and a specified storage area to be read is inputted, step 803 is effected. Since the input is not a key input, control is passed to step 808 to check the inputted command to determine whether or not the command is a write command. Since this is a read command, control is passed to step 809 in which the storage area status byte (FIG. 15) of the storage area control information in the index area associated with the storage area specified by the command is read. In step 810, the read lock or the read permanent lock is checked for the command. If the read lock has been set, step 811 notifies the error condition and enters the command wait state; otherwise, a key check is achieved in step 812 including the security level check, the unmatch check for the password number, and the lock check for the storage area, which will be described in detail later with reference to FIG. 23. If the key check result is OK, step 813 effects a read operation on the specified storage area. In step 814, the content of the storage area attribute byte or the 15th byte of the storage area control information is incremented by one. All bits of the storage area attribute byte are initialized to 0's when the IC card is issued, and thereafter the content of the attribute byte is incremented by one each time an access is made to the storage area when the IC card is used, namely, this byte functions as a kind of a counter. The utilization of the storage area attribute is not limited to the counter, however, for example, all bits may be set to 0's at the card issuance so that the content of the byte is decremented by one for each access to the storage area. Such utilizations may be selected according to the application of the IC card.

If the command received in step 802 is a write command including a write instruction, a write data item, and a storage area where the write data item is to be written, control passes from step 808 to step 815. If the inputted item is neither a read command nor a write command, the other processing is executed in step 816, and then control returns to step 802. In step 817, the storage area control information is read from the index area associated with the storage area specified by the command. After the storage area status byte is read from the storage area control information field, the write lock or the write permanent lock is checked to determine whether or not to have been set for the storage area in step 818. If the write lock has been set, an error is notified in step 819 and the program enters the command wait state; otherwise, step 820 conducts a key check, which will be described later. If the key check results in a matched state, step 821 write the data in the specified storage area. After the write operation is finished, step 822 increments the content of the storage area attribute byte by one, thereby updating the access count.

Figure 22:
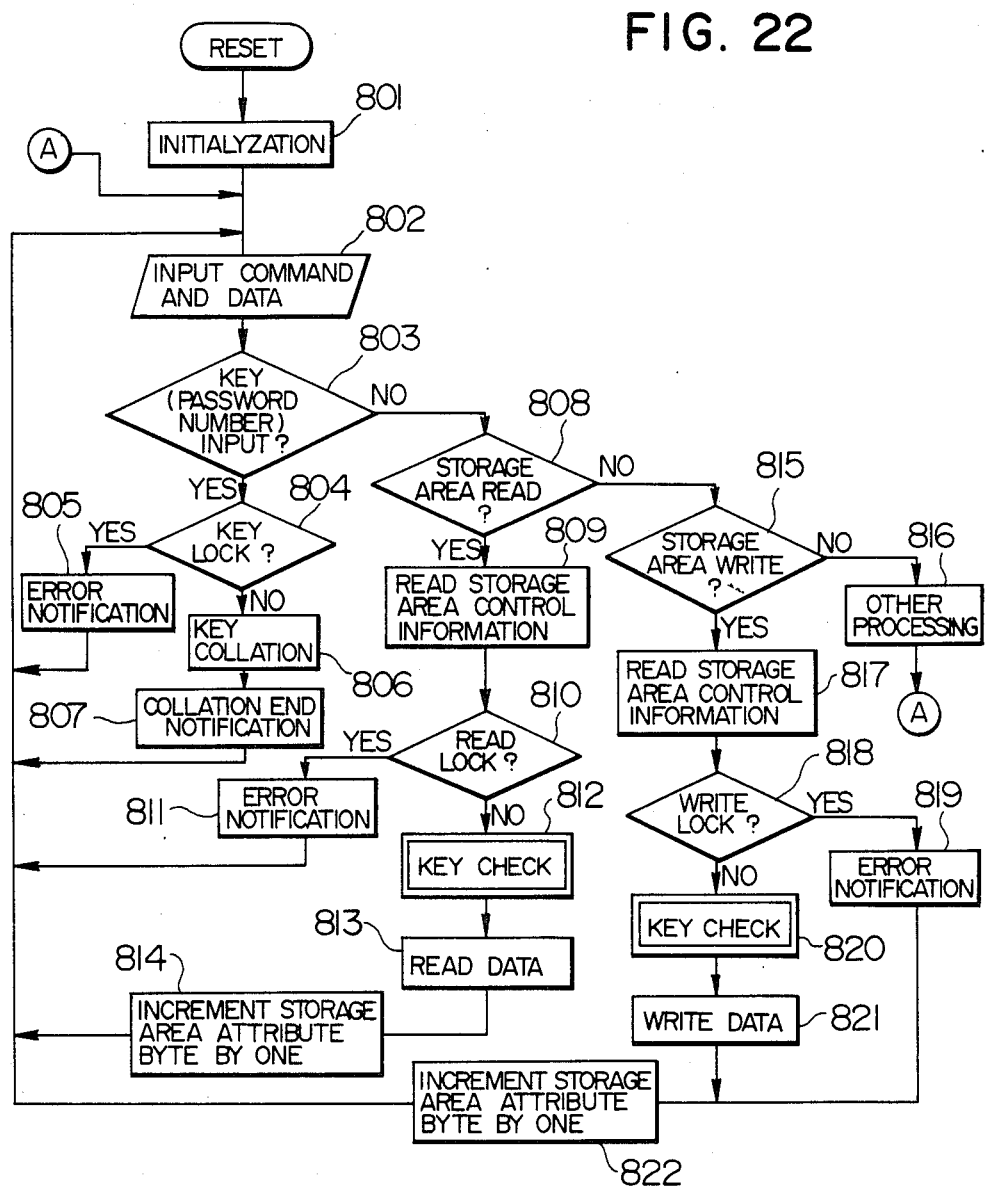
FIG. 22 is a flowchart illustrating another example of operations to read and write data when information of the storage area control information is used.

FIG. 23 is a flowchart showing in detail the key check step of FIG. 22. Since the same procedure is fundamentally used for the write key check, step 812 and the read key check, step 820, the case of a read operation will be described.

In step 900, the storage area define information is read from the index area related to the specified storage area. After the read security level, RSL is read from the storage area define information, step 901 checks the most-significant bit or the fourth bit of the security level data to determine whether the bit is "0" (enterprise key required) or "1" (enterprise key not required). If the bit is "0", step 902 checks whether or not the enterprise key has already been inputted. If the key has not been inputted, an error is notified in step 903; therwise, step 904 is effected to check the security level. If the most-significant bit of the security level data is found to have been defined as "1" in step 901, step 902 is skipped and step 904 is executed. In steps 904, 906, 908, 912, 915, and 917, three low-order bits of the security level data are checked to determine a security level at which the storage area is defined. First, the security level is checked against "001" in step 904. In the foregoing example, the value 001 is defined to require only a personal key. Consequently, in step 905, the result of the collation beforehand conducted in step 906 (FIG. 22) is read from the RAM 17; and control proceeds to the next step for the matched condition, whereas an error is notified for the unmatched condition. If other than "001" in step 904, the security level is checked against "010". In the example, the value 010 is defined to require only a control key, and hence the result of the collation achieved in step 906 is read from the RAM 17 in step 907; and control proceeds to the next step for the matched condition, whereas an error is notified for the unmatched condition. If other than "010" in step 906, the security level is checked against "011". Since the value 011 is defined to require a password number in the example, step 909 checks whether or not the personal key has been inputted. If the inputted item is a personal key, step 910 reads from the RAM 17 the result of the collation achieved between the password numbers in step 906; and control proceeds to the next step for the matched result of the personal key collation, whereas an error is notified for the unmatched result. If the item is not a personal key in step 909, the result of control key collation is read in step 911; and control proceeds to the next step for the matched condition, whereas an error is notified for the unmatched condition. If other than "011" in step 908, the security level is checked against "100". Since the value 100 is defined to require both password numbers, namely, a personal key and a control key in the example, the result of the personal key collation is read in step 913; and if the matched result is obtained, the result of the control key collation is read in step 914. If the matched result is obtained again, control proceeds to the next step. Although the control key is common to the enterprises in this embodiment, the control key may be defined as a unique key to each enterprise or may be shared among a plurality of enterprises. If a control key is set to each enterprise, a bit defining the necessity of the control key is set in the storage area define information. When a read or write operation is attempted, the control key thus defined is read from the password number area of the system area and is checked against the inputted password number. Similarly, if a control key is shared among a plurality of enterprises and another control key is assigned to another enterprise, a bit defining the control key need only be set in the storage area define information to cope with such a condition. If other than "100" in step 912, the security level is checked against "101". Since the case of "101" requires only an issuer key in this example, the result of the issuer key collation is read; and if the matched result is obtained, control proceeds to the next step; otherwise an error is notified. If other than "101" in step 915, the security level is checked against "111". If the level is other than "111", the password is not necessary to access the storage area; however information of the respective enterprise (for example, a report from a bank) may be necessary, and hence control proceeds to step 919. In step 919, to determine whether or not an enterprise key is required, the storage area define information is read and the most-significant bit of R.S.L. is checked against "0" (required) or "1" (not required). If the value is 0, the result of the collation performed in step 806 (FIG. 22) is read to confirm whether the enterprise key is matched or not. If matched, control proceeds to the next step; otherwise an error is notified. If the value is 1 in step 919, step 920 is skipped and the collation results of the password numbers are entirely checked to determine whether or not all password numbers are matched in step 21. If this is the case, step 922 is effected to read the storage area control information and resets the key error count to 0, thereby completing the key check processing. If any key or password number is unmatched in step 921, the content of the read key error count is read in step 923. If the key error count is 0 in step 924, the key error count is incremented by one and is set to one in step 925. If the key error count is 1 in step 926, the count is incremented by one and is set to two in step 927. If the key error count read in step 926 is two, the count is incremented by one and is set to three. In step 930, the read lock is written in the storage area status byte of the storage area control information, and an error is notified in step 931, thereby finishing the key check procedure.

What is claimed is:

1. An IC card having a control section and a writable memory, comprising:
   means for receiving external data input;
   said control section comprising means for receiving a plurality of external data parameters and for calculating addresses where the external data is to be stored from said parameters;
   a plurality of index areas arranged in said memory for receiving a plurality of parameters that define addresses for the external data input;
   means for writing the plurality of parameters into said index areas;
   a plurality of data storage areas allocated to a blank region in said memory when said writing means has written the parameters into said index areas, each of said data storage areas including a plurality of records, each of said records being capable of storing data that has an arbitrary data length as received from the external data input;
   means for marking a state of each record in said data storage areas whenever data is written in one of said records so as to indicate the state of the record;
   means for receiving an external instruction to read data recorded in said storage area; and
   means for selecting records that have been written based on the state of the record as indicated by the marking means.

2. An IC card according to claim 1, wherein said marking means comprises means for inverting a logic level of a marking bit in each of said data storage areas to indicate that data has already been written into the record.

3. An IC card according to claim 1, wherein said marking means comprises means for indicating an address for another record in which data can be written when data has already been written in the record.

4. An IC card according to claim 3, further comprising reading means for accessing a record based on the address indicated by said address indication means.

5. An IC card according to claim 1, wherein said parameters include a start address of a storage area, a record length, and a number of records.

6. An IC card according to claim 1 wherein said parameters include a start address of a storage area and an end address thereof.

7. An IC card according to claim 2, wherein each index parameter is arranged to correspond to an application of said IC card.

8. An IC card according to claim 3, wherein each index parameter is arranged to corresponding to an application of said IC card.

9. An IC card according to claim 1, wherein said index areas further comprise an index close bit for indicating whether a parameter has been written in the given index area, thereby checking for completion of a written operation in said index area.

10. An IC card according to claim 5, wherein said index area further comprise an index close bit for indicating whether a parameter has been written in the given index area, thereby checking for completion of a write operation in said index area.

11. An IC card according to claim 6, wherein said index areas further comprise an index close bit for indicating whether a parameter has been written in the given index area, thereby checking for completion of a write operation in said index area.

12. An IC card according to claim 7, wherein said index areas further comprise an index close bit for indicating whether a parameter has been written in the given index area, thereby checking for completion of a write operation in said index area.

13. An IC card according to claim 8, wherein said index areas further comprise an index close bit for indicating whether a parameter has been written in the given index area, thereby checking for completion of a write operation in said index area.

14. An IC card according to claim 9, wherein said writing means further comprises means for writing a parameter into an index area when said index close bit indicates that the index area has not been written.

15. An IC card according to claim 10, wherein said writing means further comprises means for writing a parameter into an index area when said index close bit indicates that the index area has not been written.

16. An IC card according to claim 11, wherein said writing means further comprises means for writing a parameter into an index area when said index close bit indicates that the index area has not been written.

17. An IC card according to claim 12, wherein said writing means further comprises means for writing a parameter into an index area when said index close bit indicates that the index area has not been written.

18. An IC card according to claim 13, wherein said writing means further comprises means for writing a parameter into an index area when said index close bit indicates that the index area has not been written.

19. An IC card according to claim 1, wherein:
   said memory comprises a plurality of first index areas an a plurality of second index areas;
   means for writing index parameters into said first index areas are provided to define an address for each of said storage areas; and
   said marking means records the state of each record in said second index area to allow access to the data based on the state of each record, said marking means further comprising means for changing the state of the record in response to processing executed on the data.

20. An IC card according to claim 19, wherein said parameters include a start address of a storage area, a record length, and a number of records.

21. An IC card according to claim 19, wherein said parameters include a start address of a storage area an end address thereof.

22. An IC card according to claim 19, wherein said IC card is a complex IC card to which said index parameters and said control mark are arranged corresponding to each one of said enterprises.

23. An IC card according to claim 19, wherein said marking means further comprises a counting means for counting the number of occurrences of a predetermined state associated with the data processing and means for changing the value of the count when the count value of said count means satisfies a predetermined condition.

24. An IC card according to claim 19, wherein said masking means comprises a flat setting means for recording data indicating a predetermined state associated with the data processing.

25. An IC card according to claim 19, wherein said marking means comprises a pointer means for recording information indicating a relationship between data items associated with the data processing.

* * * * *

UNITED STATES PATENT AND TRADEMARK OFFICE
CERTIFICATE OF CORRECTION

PATENT NO. : 4,829,169

DATED : May 9, 1989

INVENTOR(S) : Hiroshi WATANABE

Page 1 of 3

It is certified that error appears in the above-identified patent and that said Letters Patent is hereby corrected as shown below:

| Column | Line | |
|---|---|---|
| 2 | 46 | Please delete "an" and insert --a--. |
| 4 | 6 | Please delete "is an" and insert --shows the--. |
| 5 | 23 | Please delete "instantiated" and insert --illustrated--. |
| 5 | 55 | Please delete "comprises" and insert --comprise--. |
| 6 | 34 | Please delete "is" and insert --are--. |
| 6 | 59 | Please delete "ca" and insert --can--. |
| 9 | 7 | Please delete "the en-". |
| 9 | 8 | Please delete "terprise keys as many" and insert --as many enterprise keys--. |

UNITED STATES PATENT AND TRADEMARK OFFICE
CERTIFICATE OF CORRECTION

PATENT NO. : 4,829,169
DATED : May 9, 1989
INVENTOR(S) : Hiroshi WATANABE

It is certified that error appears in the above-identified patent and that said Letters Patent is hereby corrected as shown below:

| Column | Line | |
|---|---|---|
| 9 | 12 | Please delete "instantiated" and insert --illustrated--. |
| 9 | 22 | Please delete "instan-". |
| 9 | 23 | Please delete "tiated" and insert --illustrated--. |
| 9 | 27 | Please delete "beforehand set" and insert --set beforehand--. |
| 12 | 22 | Please delete "th" and insert --the--. |
| 13 | 4 | Please delete "in" and insert --is--. |
| 15 | 51 | Please delete "write" and insert --writes--. |
| 17 | 12 | Please delete "21" and insert --921--. |
| 18 | 11 | Please delete "corresponding" and insert --correspond--. |

UNITED STATES PATENT AND TRADEMARK OFFICE
CERTIFICATE OF CORRECTION

PATENT NO. : 4,829,169
DATED : May 9, 1989
INVENTOR(S) : Hiroshi WATANABE

Page 3 of 3

It is certified that error appears in the above-identified patent and that said Letters Patent is hereby corrected as shown below:

| Column | Line | |
|---|---|---|
| 18 | 19 | Please delete "area" and insert --areas--. |
| 19 | 7 | Please insert --and-- in front of "an". |

Signed and Sealed this

Twenty-eighth Day of August, 1990

Attest:

HARRY F. MANBECK, JR.

Attesting Officer

Commissioner of Patents and Trademarks